United States Patent
Hasegawa et al.

[11] Patent Number: 6,129,143
[45] Date of Patent: Oct. 10, 2000

[54] BRAZING SHEET HAVING AN EXCELLENT CORROSION RESISTANCE FOR USE IN A HEAT EXCHANGER, AND A HEAT EXCHANGER USING THE SAME

[75] Inventors: Yoshiharu Hasegawa, Obu; Haruhiko Miyachi, Okazaki; Yuji Suzuki, Ishioka; Hiroshi Ikeda, Nagoya; Hirokazu Tanaka, Tajimi; Takahiro Koyama, Ishioka; Koji Hirao, Tokai, all of Japan

[73] Assignees: Denso Corporation, Aichi; Sumitomo Light Metal Industries, Ltd., Tokyo, both of Japan

[21] Appl. No.: 08/906,455

[22] Filed: Aug. 5, 1997

[30] Foreign Application Priority Data

| Aug. 8, 1996 | [JP] | Japan | 8-225860 |
| Aug. 8, 1996 | [JP] | Japan | 8-225861 |
| Nov. 27, 1996 | [JP] | Japan | 8-331496 |

[51] Int. Cl.$^7$ .............................. F28F 21/08; B32B 15/20
[52] U.S. Cl. ........................ 165/133; 165/134.1; 428/654; 428/933
[58] Field of Search .................................. 428/654, 933; 165/134.1, 905, 133, 180

[56] References Cited

U.S. PATENT DOCUMENTS

| 4,098,957 | 7/1978 | Vernam et al. | 428/654 |
| 4,317,484 | 3/1982 | Tanabe et al. | 428/654 |
| 4,560,625 | 12/1985 | Kaifu et al. | 428/654 |
| 4,828,794 | 5/1989 | Scott et al. | 420/529 |
| 5,011,547 | 4/1991 | Fujimoto et al. | 428/654 |
| 5,125,452 | 6/1992 | Yamauchi et al. | 428/654 |
| 5,292,595 | 3/1994 | Yamauchi et al. | 428/654 |
| 5,350,436 | 9/1994 | Takezoe et al. | 428/548 |
| 5,744,255 | 4/1998 | Doko et al. | 428/654 |
| 5,863,669 | 1/1999 | Miller | 428/654 |

Primary Examiner—John J. Zimmerman
Attorney, Agent, or Firm—Flynn, Thiel, Boutell & Tanis, P.C.

[57] ABSTRACT

A brazing sheet which has an excellent corrosion resistance and cladding rolling property, and is formed from a four layer aluminum alloy cladding member, and a heat exchanger of aluminum alloy, in which the brazing sheet is used, are provided. The brazing sheet is suitable for use as a member in the fluid path of an aluminum heat exchange for a car, and particularly, as a core plate of a drawn cup type heat exchanger. In the brazing sheet, one side of a core member is cladded with an intermediate member less noble than a core member, and the other side of both the core member and the intermediate member are cladded with Al—Si—Mg type cladding member, wherein the core member is of an aluminum alloy containing 0.5 to 1.6% of Mn, 0.15 to 0.35% of Cu, 0.05 to 0.50% of Mg, 0.06 to 0.30% of Ti, and the remainder being Al and unavoidable impurities, and the intermediate member contains 0.5 to 1.2% of Mn and the remainder being aluminum and unavoidable impurities, and 0.05 to 1.2% of Mg, if desired, and has a 70 to 130% deformation resistance. The intermediate member may be composed of an aluminum alloy containing 1 to 5% of Zn, 0.5 to 1.2% of Mg, and the remainder being Al and unavoidable impurities.

11 Claims, 2 Drawing Sheets

BRAZING SHEET HAVING AN EXCELLENT CORROSION RESISTANCE FOR USE IN A HEAT EXCHANGER, AND A HEAT EXCHANGER USING THE SAME

A brazing sheet having an excellent corrosion resistance for use in a heat exchanger and a heat exchanger using the same.

1. Field of the Invention

The present invention is directed to a brazing sheet having an excellent corrosion resistance for use in a heat exchanger and a heat exchanger using the same. The brazing sheet of the present invention is used for a heat exchanger in a car, for example, and is suitable as a constitutional member for a fluid path in the heat exchanger, such as an evaporator, and inter-cooler in a car air-conditioner, which is joined by a vacuum brazing process. In particular, the present invention concerns a brazing sheet of an aluminum alloy, which is most preferably used as a constitutional member for a fluid pass in a drawn cup type heat exchanger, and a heat exchanger using said brazing sheet.

2. Background of the Invention

In an oil cooler, intercooler, heater, and evaporator of an air conditioner, condenser, etc., in a heat exchanger for a car, and an oil cooler for an oil press machine and an industrial machine, various types of heat exchangers of aluminum alloys are used. For example, a corrugated fin type heat exchanger, which has been mainly used in a condenser and an evaporator, is constituted by brazing joining a brazing sheet fin member, which was formed into a corrugated configuration, and a multiple holes flat tube, processed by a serpentine process.

On the other hand, a drawn cup type heat exchanger, which exhibits an excellent performance and has been used particularly as an evaporator, is formed by superposing core plates, which are made by press forming a cladding brazing sheet having brazing members on both sides, providing a fin member of an aluminum alloy, which is processed to be corrugated, and joining them together by brazing. The fluid path is formed between piled core plates.

The core plate is formed by using a brazing sheet, which is composed of a core member of an alloy, such as an Al—Mn type, Al—Mn—Cu type, Al—Mn—Mg type, and Al—Mn—Cu—Mg type, which contains a JIS 3003 alloy, 3005 alloy, etc. as a main alloy component, for which a brazing member of the Al—Si—Mg type is used as cladding. As for the fin member, materials of the Al—Mn type, Al—Mn—Mg type, Al—Mn—Cu type, and Al—Mn—Zn type are used. The junction between the core plate and fin member is generally formed by vacuum brazing.

In the brazing sheet discussed above, the core member containing Mn, as a principal component, does not always exhibit sufficient pitting corrosion resistance and if it is used as a fluid path member for a coolant, an accident due to a penetrating leakage from outside (air side) is liable to often occur. As a countermeasure, a corrosion resistant fluid path is proposed, for example, by using a potentially more noble metal than that of the path material, such as an Al—Mn—Zn alloy, Al—Mn—Sn alloy, etc., according to the sacrificial anode effect of said fin member.

However, particularly in the case of an evaporator, when the coolant is evaporated in the heat exchanger by removing heat from the atmosphere, the surface temperature of the heat exchanger is lowered, resulting in the condensation of moisture contained in the atmosphere and forming droplets on the fin. Since these droplets contain small amounts of impurities, the electrical conductivity is lowered, and an electric current generated due to the sacrificial anode effect may reach as far as near the joining part in the fin. Accordingly, the sacrificial effect will not reach to a part slightly farther from the joining point in the fin. Furthermore, if contaminants, such as an exhaust gas from a light oil and a car engine, or $SO_4^{-2}$, $NO_3^-$, are contained in the droplets, they are condensed and maintained in a pitching corrosion, thereby remarkably promoting corrosion, and causing a penetrating corrosion in the core plate. These corrosions are liable to cause the leaking of a coolant, which may be a problem.

To overcome these problems, a four-layered cladding, in which an intermediate member Al alloy having a 20 to 100 mV lower potential than the core material interposed between the core member and brazing member, is proposed (Japanese Laid-Open Patent Publication No. Sho 60-251243). Although, these cladding materials comprise as a core member an aluminum alloy containing 0.2 to 1.0% of Si, 0.1 to 0.5% of Mg and 0.2 to 1.0% of Cu as essential components and, as an intermediate member, an aluminum alloy containing at least one member of 0.05 to 0.5% of Mn and 0.05 to 0.5% of Mg, etc., these cladding members, however, may be expected to improve the corrosion resistance but the strength after the brazing process is weak, thereby making it difficult to maintain the pressure resistance of the heat exchanger. Further, the junction between each layer is liable to be insufficient during hot rolling. Since the strength and elongation of each layer are not uniform, a cladding element is liable to warp, and a problem in manufacture may also be caused, such that the cladding rate varies widely.

Another approach for obtaining a corrosion resistive effect by the sacrificial effect of Zn by adding it to the brazing element, may also be tried. However, regardless of the effectiveness of Zn as a sacrificial anode, Zn has drawbacks. When the brazing takes place, since the vapor pressure of Zn at the brazing temperature is higher than the vacuum pressure in the brazing furnace, almost all of the Zn evaporates during the brazing process, and is not maintained in the plate member, resulting in causing troubles that the sacrificial anode effect may not be attained. As an alternative approach, Zn plating may be carried out over the evaporator after brazing, followed by a heat treatment for dispersing the Zn, but said process steps require many steps, resulting in a higher cost.

In the case where an intermediate member is provided between the core member and brazing member, if a difference in elongation between the intermediate member and the core element exists, troubles such as warping occurring during hot rolling, being likely to cause insufficient joining between each layer, and causing a variety in thickness of the claddings, may be found. In the problem of warping, said problem may be reduced to some extent by slowing down the rolling speed. However, this process lowers the production efficiency and is not suitable for mass production.

In the drawn cup type heat exchanger, a fluid path is formed using an annealed member (O member) as a plate member and by joining the plates to each other after the press-forming thereof. Stress caused in press forming recrystallizes in the subsequent brazing step and disappears. However, in the case of an Al—Mn type alloy, since the recrystallization temperature required is higher, when the stress caused is slight, the stress does not completely disappear, even at the melting temperature of the brazing, and forms a state in which subgrain boundaries are maintained, which is caused by recovered stress. In the subgrain boundaries, since a dispersion easily occurs, thereby dispersing a lot of Si brazing into the core member and resulting in a lack of brazing, which is required for joining, and causes brazing not to occur. In a part where the brazing is penetrated, the corrosion resistance deteriorates, and the strength is also lowered. In order to overcome said problems, various methods are proposed such that a homogenizing treatment of the core member is carried out at a higher temperature, and final annealing is conducted at a higher temperature for a long time. However, these are not effective as a sufficient countertreatment.

SUMMARY OF THE INVENTION

An object of the present invention is to provide a brazing sheet for a heat exchanger which has an excellent corrosion resistance, and comprises a four-layered aluminum alloy cladding member, in which one side of a core member is cladded with an intermediate member not as noble as the core member, and the other side of both the core member and the intermediate member are cladded with an Al—Si—Mg type cladding member, wherein the core member is an aluminum alloy comprising 0.5 to 1.6% of Mn, 0.15 to 0.35% of Cu, 0.05 to 0.70% of Mg, 0.06 to 0.30% of Ti, and the remainder being Al and unavoidable impurities.

Another object of the present invention is to provide a heat exchanger of an aluminum alloy, which is composed of a four-layered aluminum cladding brazing sheet, in which one side of a core member is cladded with an intermediate member less-noble than the core member, and the other sides of both the core member and the intermediate member are cladded with an Al—Si—Mg type cladding member, wherein the core member is of an aluminum alloy comprising 0.5 to 1.6% of Mn, 0.15 to 0.35% of Cu, 0.05 to 0.70% of Mg, 0.06 to 0.30% of Ti, and the remainder being Al and unavoidable impurities, and the intermediate member is an aluminum alloy comprising 1 to 5% of Zn, 0.5 to 1.2% of Mg, and the remainder being Al and unavoidable impurities, a plurality of the brazing sheets are superposed on each other so that the intermediate members may face outward, and the superposed brazing sheets are joined together by brazing, wherein the concentration of Zn in the boundary between the core member and the intermediate member after brazing is 0.5 to 2.5%, and the average concentration of Zn between a thickness center of the core member to a boundary between the core member and a brazing member is preferably 0.3% or lower. The percentage (%) for the aluminum alloy composition is weight percentage (wt %).

DETAILED DESCRIPTION OF THE INVENTION

Figure 1A:
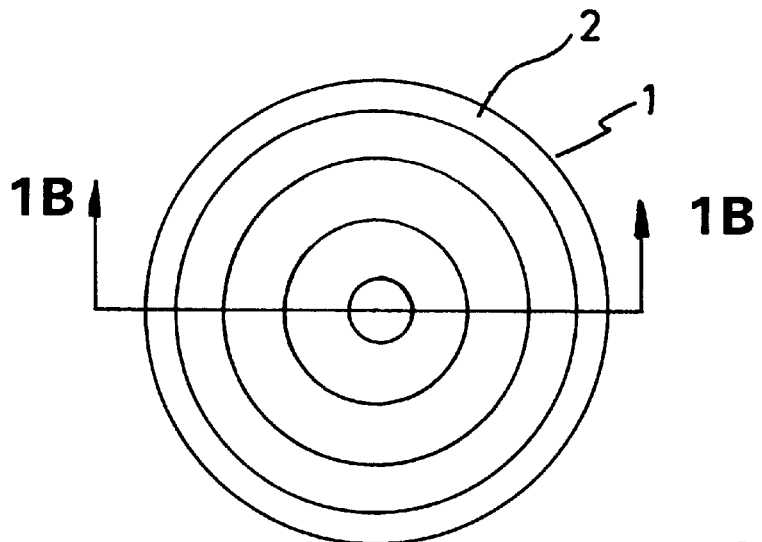
FIG. 1A shows a top view of the press-forming members.

In order to obtain a four-layered cladding member, which overcomes the above problems caused in a fluid path in the heat exchanger of an aluminum alloy, the present inventors have experimented on and studied the intermediate member for overcoming the problems in providing an excellent corrosion resistance and forming the cladding. As a result, the inventors found that when an aluminum alloy containing Mg is used as an intermediate member, Mg exhibits a function of deteriorating the potential, and improving the strength, thereby being capable of stably carrying out hot rolling cladding.

Further, the inventors found that when Mn, additionally with Mg, is contained in an intermediate member, the Mn reacts with Si, which is dispersed from the brazing member in a brazing process, and forms an Al—Mn—Si type compound. The potential is maintained as a basic condition in order to make the amount of solid solution smaller, whereas the strength of the intermediate member is increased by adding Mn and Mg, resulting in the capability of stably applying hot rolling on the cladding.

Still further, the inventors found that when Zn is added to the intermediate member, the following phenomenon is caused.

That is, in a part of the cladding member near the surface thereof, Zn is dispersed towards the brazing side and evaporates during the brazing process, but in a core member side far from the surface thereof, Zn remains without evaporating. Since Zn is dispersed also towards the core member, the concentration of Zn is at a maximum at around the boundary between the intermediate member and the core member, and shows a distribution so that the concentration may become lower at both the brazing and core members sides. Accordingly, the potential distribution in the core member is less noble at the boundary with the intermediate member and gradually becomes more noble towards inside of the core member. Thus, the intermediate member and core member at the intermediate member side form sacrificial anodes with respect to the core member at the side opposite to the intermediate member (brazing member side), thereby suppressing the pitching corrosion.

The present invention was achieved by the above findings, and by the results of experiments and studies on a combination of compositions of the core member and intermediate member. An object of the present invention is to provide an aluminum alloy brazing sheet having an excellent corrosion resistance and cladding rolling performance, which is capable of forming a heat exchanger by a vacuum brazing operation, particularly, a brazing sheet which is capable of preferably being used as a core plate member in a drawn cup type heat exchanger, and a heat exchanger using said brazing sheet.

The brazing sheet member for the heat exchanger according to the present invention in order to accomplish the above object, is characterized by an aluminum alloy brazing sheet, which is formed by cladding an intermediate member, which shows a lower basic potential than that of a core member, onto one face of the core member, and further cladding Al—Si—Mg type claddings on the other faces of the intermediate member and core member, wherein the core member comprises 0.5 to 1.6% of Mn; 0.15 to 0.35% of Cu; 0.05 to 0.50% of Mg; 0.06 to 0.30% of Ti, and the remainder being Al and impurities.

The other features of the heat exchanger of the present invention are summarized as follows:

A. The intermediate member is made of an Al alloy composed of 0.3 to 1.5% of Mg and the remainder being Al and unavoidable impurities, and has 70 to 130% of a deformation resistance rate based on that of the core member. The thickness of the intermediate member in the four-layered cladding is 30 to 150 μm.

B. The intermediate member is made of an Al alloy composed of 0.5 to 1.2% of Mn and the remainder being Al and unavoidable impurities, or 0.5 to 1.2% of Mn, 0.05 to 1.2% of Mg, and unavoidable impurities, and has 70 to 130% of a deformation resistance rate based on that of the core member. The thickness of the intermediate member in the four-layered cladding is 30 to 150 μm.

C. The intermediate member is made of an Al alloy composed of 1 to 5% of Zn, 0.5 to 1.2% of Mg, and the remainder being Al and unavoidable impurities.

The heat exchanger according to the present invention is formed by superimposing the brazing sheets over each other, which are press-formed previously, having the intermediate member C above, so as to be placed that the intermediate member is positioned outside, and brazing the brazing sheets. The heat exchanger of the present invention is characterized by controlling the Zn concentration at the boundary between the intermediate member and the core member at 0.5 to 2.5% and the average Zn concentration in the core member from the center of the thickness to the boundary between the core member and brazing member.

DETAILED DESCRIPTION OF THE PREFERRED EMBODIMENTS

An object for adopting additives and a reason for restricting the same in the core member and the intermediate member are explained in more detail below.

A. Core member

Mn has the function of improving the strength of the core member, and making the potential difference between the core member and the fin member larger, so that the anti-pitching corrosion may be enhanced. The amount of Mn is preferably 0.5 to 1.6%, and more preferably 0.7 to 1.4%. At less than 0.5%, the expected effect is low, and over 1.6%, large grains of the compound will form during casting, thereby making the rolling operation difficult to obtain a sound plate.

Cu has the function of improving the strength of the core member and making the potential of the core member noble, thereby making the potential difference larger to improve the corrosion resistance by the sacrificial anode effect. The amount of Cu is preferably 0.15 to 0.35%. At less than 0.15%, the expected effect is low, and over 3.5%, the elongation of the brazing sheet becomes lower, resulting in the possibility of cracks during the press forming operation.

Mg has the advantage of improving the strength of the core member and also has the function of improving the corrosion resistance of the core member by coexisting with Cu. The amount of Mg is preferably 0.05 to 0.50%, and more preferably 0.1 to 0.34%. At less than 0.05%, the expected effect cannot be sufficiently attained, and at over 0.5%, the Mg will be unevenly distributed, thereby lowering the corrosion resistance, as well as being likely to penetrate the brazing member during the brazing operation.

Ti exists separately in high and low concentration regions towards the thickness direction of the member, and these regions form layered structures, which are alternately superimposed, thereby creating layered corrosive constructions towards the thickness direction with the region having a low concentration of Ti being preferentially corroded compared to the high concentration region. Thus, the corrosion resistance of the member is remarkable improved by interrupting the progression in the corrosion towards the thickness direction. The amount of Ti is preferably 0.06 to 0.30%. At less than 0.06%, the expected effect cannot be sufficiently attained, and over 0.30%, huge crystals are likely to form during the casting process, resulting in it becoming difficult to prepare a sound member. In the core member, if 0.20% or less of Si, 0.30% or less of Fe, 0.15% or less of Cr, and 0.15% or less of Zr are present, the property of the core member is not affected.

B. Intermediate member

Mg in the intermediate member is an element for contributing to an improvement in strength. Mg also makes an improvement in the cladding rolling property for reducing warping during the press rolling operation by minimizing the strength difference between the core member. In the case of a vacuum brazing operation, Mg existing near the surface layer may evaporate during brazing, whereas, Mg near the core member is maintained to enhance the strength after brazing, thereby raising the pressure resistive strength. Further, Mg makes the potential of the intermediate member noble and improves the sacrificial anode effect.

Further, an Al—Mg type alloy used as the intermediate member generally has a low recrystallization temperature compared with an Al—Mn—type alloy. For this reason, even if a slight strain is caused in the press-forming operation, since the recrystallization will be completed before melting the brazing, the strain, due to factors such as dislocation, will be easily released. Thus, the inner grain penetration of the brazing is suppressed and the brazing property is further improved. The amount of Mn is preferably 0.3 to 1.5%. At less than 0.3%, the effect of improving the strength cannot be sufficiently attained, whereas, over 1.5%, the crystal grain becomes finer, thereby penetrating the molten brazing into the crystal grain boundary, resulting in it being likely to cause brazing defects. Additionally, Mg on a surface of the intermediate member oxidizes to deteriorate the cladding joint property.

Mn in the intermediate member is an element for contributing to an improvement in strength, and improves the cladding rolling property in reducing warping during the cladding rolling operation due to the strength difference between the core member. The amount of Mn is preferably 0.5 to 1.2%, most preferably 0.7 to 1.2%. At less than 0.5%, the effect of improving the strength cannot be sufficiently attained. In the brazing sheet, Mn is formed in a solid solution, while maintaining a noble potential, however, during the heating for the brazing, since Mn reacts with Si dispersed in the brazing to form an Al—Mn—Si type compound, the potential cannot be noble due to the reduction of the amount of Mn solid solution. Thus, with a Mn content of over 1.2%, since the above compound cannot be sufficiently formed, the potential becomes noble, resulting in a lowering of the sacrificing anode effect.

Mg, which is added with Mn, contributes to the improvement in strength, as well as Mn, and improves the cladding rolling property for minimizing warping during the cladding rolling operation by reducing the strength difference between the core member. The amount of Mg is preferably 0.05 to 1.2%. At less than 0.05%, the effect of improving the strength cannot be sufficiently attained, whereas over 1.2%, the crystal grain becomes finer after the brazing operation, and the molten brazing penetrates into the crystal grain boundary, thereby being likely to cause a brazing defect. Further, surface oxidation occurring in the hot rolling operation lowers the cladding joint performance.

According to the present invention, the strength difference between the core member and intermediate member is smaller, thereby improving the cladding rolling performance. As for the intermediate member, it is required to provide 70 to 130% of the deformation resistance. At less than 70% and over 130%, respectively, each of an intermediate layer and core member is likely to elongate and warp during the cladding rolling operation. If significant warping occurs, the member will hit the rolling machine, sometimes resulting in a stoppage of subsequent operation. It should be noted that the deformation resistance discussed herein means the deformation resistance under a hot process, and the average value thereof may be obtained by the following procedure.

A cylindrical specimen is upset at a high temperature under respective compression rates, to obtain a load-displacement curve and a stress-strain curve. Using a maximum load P, initial cross sectional area $A_0$, and correction factor f, obtained from the upset rate, in each test, the deformation resistance in each upset is calculated by following equation to obtain average;

$$\text{deformation resistance} = P/(A_0 \times f)$$

(please refer to Osakada, Kawasaki, and Mori; Annals of the CIRP, Vol. 30, No. 1, 1981).

According to the present invention, the potential of the intermediate member is less noble than that of the core member, and the intermediate member exhibits the sacrificial effect to the core member. During the brazing operation, the dispersion of Cu into the brazing material is diminished, the Cu concentration on the surface becomes lower, and the brazing material layer exhibits the sacrificial effect, a cathode reaction which causes corrosion, is also reduced, thereby improving the corrosion resistance. The thickness of the intermediate member is preferably 30 to 150 $\mu$m, because at less than 30 $\mu$m, Cu disperses from the core member to the brazing material, to make the potential noble, resulting in reducing the sacrificial effect.

Since the intermediate member has a less noble potential than the core member, as far as the intermediate member layer, the corrosion proceeds in relatively short time. When the thickness of the intermediate member is over 150 $\mu$m, the thickness of the core member becomes thinner, thereby lowering the pitching life of the whole cladding member.

Zn in the intermediate member enhances the sacrificial effect by making the potential less noble. The amount of Zn, considering the evaporation thereof during vacuum brazing, is preferably 1 to 5%, more preferably 1.2 to 5%. At less than 1%, the expected effect is too small, whereas over 5%, since the average Zn concentration in the core member after the brazing operation, from the center of the core member thickness to the boundary between the core member and brazing member, is to be over 0.3%, the sacrificial effect may become too large, and a noble core member, which should be maintained, is reduced, thereby making it difficult to surely prohibit pitching corrosion, and increases the evaporating amount of Zn, which inherently causes the trouble of the contamination of the furnace. In the vacuum brazing process, Mg, which evaporates from the brazing member, deposits on a wall of the furnace. If the vacuum is released after brazing as it is, it is dangerous because the Mg on the wall of the furnace will react with oxygen in the atmosphere and start burning. Thus, generally a small amount of Zn, which is similarly liable of evaporating in the vacuum brazing with Mg, is added in the fin member, so that Zn may be deposit on the wall of the furnace as a compound with Mg and suppress the reactivity of Mg with oxygen in the atmosphere.

In the present invention, since Zn, which evaporates from the intermediate member during the vacuum brazing process, is deposited on the furnace wall together with Mg, which evaporates from the brazing member, it is not necessary to conventionally add Zn to the fin member, and a 3003 alloy or 3203 alloy may be used as a fin member, as they are. Thus, a special fin member adding Zn is not required and a reduction in cost can be accomplished.

Mg, which is added with Zn, contributes to an improvement in strength, and reduces the strength difference between the core member, thereby reducing warping in the cladding rolling process and improving the cladding rolling performance. In the vacuum brazing, since Mg existing near the surface layer part evaporates, whereas that existing near the core member remains, the strength after brazing also improves, thereby enhancing the pressure resistance strength. Mg also exhibits the function of improving the sacrificial effect by making the natural electrode potential basic. The Mg content is preferably 0.5 to 1.2%. At less than 0.5%, the effect of improving the strength cannot be sufficiently attained, whereas over 1.2%, the crystal grain becomes finer after the brazing operation, and molten brazing penetrates into the crystal grain boundary and thereby is likely to cause a brazing defect. Further, surface oxidation occurs during the hot rolling process and the cladding joint property lowers.

The intermediate member of the present invention maintains the natural electrode potential less noble by adding Zn, enhances the strength and reduces the strength difference between the core member by adding Mg, thereby allowing the conducting of stable cladding hot rolling. Since the intermediate member of the present invention does not contain Mn, the recrystallizing temperature is lower than that of the Al—Mn type member. Accordingly, even if the press rolling process takes place at a low level, the recrystallization process may be completed before melting the brazing member, a transgranular penetration hardly occurs, and problems of causing brazing defects due to the lack of the brazing material and lowering the strength, are overcome, resulting in the maintenance of sufficient corrosion resistance.

Additionally, in the intermediate member, 0.2% or lower of Si, 0.30% or lower of Fe, 0.2% or lower of Cr, Zr, or Ti, may be contained without affecting the properties of the brazing sheet according to the present invention.

The aluminum alloy brazing sheet for use in the heat exchanger according to the present invention is formed by the process, which comprises, for example, casting an aluminum alloy, of which the core member, intermediate member and brazing member are composed of, into ingots by semi-continuous casting, heating and soaking the ingots, and hot rolling into a desired thickness, particularly for the intermediate member and brazing member, subsequently cladding by hot rolling in a conventional manner after combining each member, cold rolling the cladding into the desired thickness, and finally annealing. When the brazing sheet of the present invention is formed into, for example, a core plate for a drawn cup type heat exchanger, formed core plates are superposed over each other, so that the intermediate member may be positioned outside, and these superposed plates are used for forming the drawn cup-type aluminum heat exchanger for a car, such as an evaporator, a fin of an aluminum alloy is assembled on the outside and the intermediate member side of the superposed core plates, and vacuum brazing thereof in the brazing furnace.

For this reason, in the brazing sheet of the present invention, an Al—Si—Mg type brazing member is cladded for vacuum brazing. As the cladding member for vacuum brazing, an Al—Si—Mg alloy is used, which basically contains 6 to 13% of Si and 0.5 to 3.0% of Mg. To improve the brazing property, at least one of the ingredients, selected from 0.2% or lower of Bi and 0.2% or lower of Be, may also be contained therein.

In the heat exchanger formed by using the brazing sheet having the intermediate member which contains said Zn, the sacrificial anode effect in the heat exchanger of aluminum obtained by the vacuum brazing process, depends on the distribution of Zn remaining after vacuum brazing. In the brazing process, Zn in the intermediate member disperses into the brazing member and core members. The Zn dispersed into the brazing member evaporates during the brazing process, whereas the Zn dispersed into the core member does not evapoarate. Thus, the concentration of Zn is at a maximum near the boundary between the intermediate member and core member, thereby forming a Zn concentration gradient at the brazing member side and core member side. According to the present invention, the Zn concentration at the boundary (boundary face and vicinity thereof) between the intermediate member and the core member, is preferably 0.5 to 2.5%, whereas the average Zn concentration in the core member, from the thickness center of the core member to the boundary between the core member and the brazing member is 0.3% lower.

With a Zn concentration of 0.5% or lower at the boundary of the intermediate member and core member, the potential gradation is small and a sufficient sacrificial anode effect cannot be exhibited. On the other hand, over 2.5%, a large amount of Zn is dispersed into the core member, thereby exhaustion of the core member rapidly proceeds, and the penetrating life is likely to deteriorate. Provided that the average Zn concentration in the core member, from the thickness center thereof to the boundary between the core member and the brazing member, is over 0.3%, the sacrificial anode effect of the intermediate member and the intermediate member side of the core member becomes too large, thereby reducing a noble core member, which should be protected, and makes it difficult to surely prevent the penetration corrosion. In the present invention, since Cu is contained in the core member, the Cu is dispersed into the brazing member at the other side of the intermediate member, thereby making the potential of the core member at the brazing member side noble. According to a synergistic effect of the potential distribution by Cu, and those by Zn, the potential difference between the core member and the intermediate member becomes so large that a sufficient sacrificial anode effect can be attained. Accordingly, even under the environment of a high electroconductive rate dilute solution, which cannot be expected for attaining the sacrificial anode effect, excellent corrosion resistance is attained.

The present invention is further explained in more detail by referring to the examples, which do not constrict the scope of the present invention.

EXAMPLE 1

By continuous casting, aluminum alloys for a core member, having compositions shown in Table 1, and for an intermediate member, having compositions shown in Table 2, were casted into ingots, and were treated for homogenization. For forming the intermediate member, the ingot was hot rolled to a desired thickness. Separately, a brazing member was prepared by casting an alloy (JIS BA4104, Si:10%, Mg:1.5%, and Bi:0.1%) in the same manner, and hot rolling at 480° C. to such a thickness that the cladding rate might be 10%, after surface grinding thereof. The core member, and intermediate member, having the same identification numbers in each Table, and together with the brazing member, were superposed in the order of brazing-intermediate-core, and hot cladding rolled at 480° C. to obtain cladding plate of 3 mm in thickness. The cladding plate, thus obtained, was further cold-rolled, and annealed to form a cladding plate (O member, brazing sheet) having 0.5 mm in thickness.

TABLE 1

| Core member | Composition (wt %) | | | | | | | |
|---|---|---|---|---|---|---|---|---|
| | Cu | Mn | Mg | Ti | Cr | Zr | Si | Fe |
| 1 | 0.17 | 1.23 | 0.18 | 0.16 | 0.03 | 0.01 | 0.09 | 0.19 |
| 2 | 0.32 | 0.89 | 0.22 | 0.18 | 0.01 | 0.02 | 0.19 | 0.13 |
| 3 | 0.30 | 0.53 | 0.21 | 0.22 | 0.02 | 0.11 | 0.14 | 0.22 |
| 4 | 0.27 | 0.72 | 0.14 | 0.20 | 0.13 | 0.02 | 0.12 | 0.24 |
| 5 | 0.31 | 1.36 | 0.24 | 0.13 | 0.03 | 0.03 | 0.08 | 0.27 |
| 6 | 0.25 | 1.55 | 0.17 | 0.16 | 0.04 | 0.01 | 0.11 | 0.16 |
| 7 | 0.17 | 0.79 | 0.07 | 0.17 | 0.06 | 0.01 | 0.07 | 0.08 |
| 8 | 0.25 | 0.89 | 0.12 | 0.18 | 0.05 | 0.02 | 0.09 | 0.15 |
| 9 | 0.30 | 0.99 | 0.28 | 0.20 | 0.01 | 0.01 | 0.10 | 0.23 |
| 10 | 0.24 | 0.98 | 0.60 | 0.15 | 0.03 | 0.02 | 0.16 | 0.17 |
| 11 | 0.19 | 1.20 | 0.18 | 0.07 | 0.01 | 0.17 | 0.17 | 0.19 |
| 12 | 0.24 | 1.14 | 0.22 | 0.14 | 0.03 | 0.04 | 0.10 | 0.17 |
| 13 | 0.26 | 1.13 | 0.18 | 0.23 | 0.02 | 0.03 | 0.16 | 0.19 |
| 14 | 0.28 | 1.17 | 0.20 | 0.28 | 0.04 | 0.02 | 0.17 | 0.23 |
| 15 | 0.25 | 1.09 | 0.19 | 0.14 | 0.02 | 0.01 | 0.10 | 0.22 |
| 16 | 0.30 | 0.84 | 0.28 | 0.17 | 0.12 | 0.01 | 0.12 | 0.21 |
| 17 | 0.31 | 0.90 | 0.27 | 0.15 | 0.01 | 0.03 | 0.13 | 0.23 |
| 18 | 0.24 | 1.07 | 0.17 | 0.17 | 0.03 | 0.03 | 0.12 | 0.18 |

TABLE 2

| Intermediate member | Composition (wt %) | | | | | | |
|---|---|---|---|---|---|---|---|
| | Mg | Si | Fe | Cu | Mn | Cr | Ti |
| 1 | 0.90 | 0.09 | 0.21 | 0.00 | 0.00 | 0.01 | 0.01 |
| 2 | 0.81 | 0.07 | 0.17 | 0.02 | 0.02 | 0.02 | 0.03 |
| 3 | 1.20 | 0.08 | 0.23 | 0.03 | 0.04 | 0.04 | 0.02 |
| 4 | 1.05 | 0.09 | 0.22 | 0.01 | 0.03 | 0.03 | 0.01 |
| 5 | 1.20 | 0.12 | 0.28 | 0.00 | 0.01 | 0.02 | 0.00 |
| 6 | 0.79 | 0.14 | 0.18 | 0.00 | 0.03 | 0.04 | 0.00 |
| 7 | 0.95 | 0.15 | 0.20 | 0.00 | 0.04 | 0.09 | 0.03 |
| 8 | 1.03 | 0.09 | 0.19 | 0.01 | 0.08 | 0.12 | 0.01 |
| 9 | 0.98 | 0.10 | 0.15 | 0.03 | 0.03 | 0.03 | 0.16 |
| 10 | 0.75 | 0.09 | 0.19 | 0.04 | 0.04 | 0.04 | 0.12 |
| 11 | 1.13 | 0.07 | 0.23 | 0.00 | 0.00 | 0.00 | 0.03 |
| 12 | 1.09 | 0.09 | 0.22 | 0.00 | 0.06 | 0.01 | 0.01 |
| 13 | 0.76 | 0.10 | 0.17 | 0.00 | 0.03 | 0.02 | 0.02 |
| 14 | 0.99 | 0.17 | 0.22 | 0.01 | 0.03 | 0.15 | 0.04 |
| 15 | 0.39 | 0.14 | 0.24 | 0.00 | 0.01 | 0.01 | 0.03 |
| 16 | 1.42 | 0.09 | 0.19 | 0.01 | 0.04 | 0.01 | 0.08 |
| 17 | 0.86 | 0.10 | 0.23 | 0.02 | 0.03 | 0.02 | 0.03 |
| 18 | 0.79 | 0.12 | 0.22 | 0.01 | 0.04 | 0.01 | 0.01 |

A circular plate was cut out from the cladding plate, and press-formed into a shape 1, as shown in FIG. 1, so that the intermediate member might form a convex face. The cup-shaped pressing articles 2, shown in FIG. 2, were alternately interposed as shown in FIG. 2, and vacuum brazed to form brazed article 3. The brazing process was carried out under $5 \times 10^{-5}$ Torr or lower of vacuum and at 600° C. for 3 minutes.

A corrosion resistance test was conducted for the brazing article 3 using pseudo-condensed water. The water contained 10 ppm of $Cl^{-0}$ and 200 ppm of $SO_4^{2-0}$ and was sprayed continuously. The testing condition other than the water was according to a salt spray test (JIS Z 2371) to detect any occurring leakage after 3000 hours testing. Separately, a single plate without conducting press forming was heated under the above vacuum brazing conditions and subjected to the same corrosion resistance test to evaluate the maximum depth of the corrosion.

Besides these, a cladding plate before brazing and a single plate without a press-forming process were heated under the vacuum brazing conditions and evaluated in a tensile strength test. As for the brazing article, attacks to the brazing member were evaluated in the cross-sectional structure by microscopic observation. After hot pressing the core member and intermediate member, a cylindrical specimen 8 mm in diameter and 16.5 mm in height was cut out and subjected to an upset test at 480° C., which was the same temperature as the hot-cladding rolling temperature, to measure the deformation resistance. The deformation resistance was evaluated by applying 10 mm/min. of stroke speed, and varying 20 to 80% in the upsetting rate, to obtain the average.

The results of the deformation resistance of the core member and intermediate member, ratio of the intermediate member with respect to that of the core member, thickness of the intermediate member, tensile strength before and after the brazing process, and the result of the corrosion resistance are shown in Table 3. As seen from the results in Table 3, any specimens according to the present invention were able to form a sound cladding steel without warping during the hot cladding rolling process, showed no penetration of the brazing member, had an excellent tensile strength after brazing, and had no cracking in a press-forming process into a cup-shaped article. In the corrosion resistance test, the maximum corrosion depth was less than 200 μm, and an excellent corrosion resistant property was exhibited without causing any leakage in the brazed articles.

possibility for press-forming, measured tensile strength, corrosion resistance test and micro-structure observation. Furthermore, the deformation resistance of the core member and the intermediate member was evaluated, respectively, in the same manner as in Example 1. The results of the deformation resistance for the core member and intermediate member, the ratio thereof, the thickness of the intermediate member, possibility of press-forming, tensile strength, corrosion test, and microstructure observation are shown in Table 6.

TABLE 4

| Core member | Composition (wt %) | | | | | | | |
|---|---|---|---|---|---|---|---|---|
| | Cu | Mn | Mg | Ti | Cr | Zr | Si | Fe |
| 19 | 0.27 | 0.89 | 0.17 | 0.15 | 0.03 | 0.01 | 0.08 | 0.22 |
| 20 | 0.22 | 1.07 | 0.12 | 0.17 | 0.01 | 0.02 | 0.09 | 0.21 |
| 21 | 0.22 | 1.07 | 0.12 | 0.17 | 0.02 | 0.03 | 0.09 | 0.21 |
| 22 | 0.32 | 0.57 | 0.22 | 0.14 | 0.01 | 0.01 | 0.08 | 0.18 |
| 23 | 0.32 | 0.57 | 0.22 | 0.14 | 0.03 | 0.02 | 0.08 | 0.18 |
| 24 | 0.54 | 0.95 | 0.33 | 0.16 | 0.04 | 0.01 | 0.07 | 0.17 |
| 25 | 0.07 | 1.06 | 0.06 | 0.18 | 0.05 | 0.03 | 0.09 | 0.22 |
| 26 | 0.29 | 0.89 | 0.17 | 0.47 | 0.01 | 0.03 | 0.09 | 0.24 |
| 27 | 0.17 | 1.43 | 0.05 | 0.02 | 0.03 | 0.01 | 0.08 | 0.22 |
| 28 | 0.23 | 0.76 | 1.04 | 0.17 | 0.02 | 0.03 | 0.08 | 0.17 |
| 29 | 0.17 | 0.78 | 0.01 | 0.18 | 0.01 | 0.01 | 0.10 | 0.18 |
| 30 | 0.30 | 2.02 | 0.12 | 0.24 | 0.03 | 0.03 | 0.09 | 0.19 |
| 31 | 0.30 | 0.38 | 0.12 | 0.24 | 0.01 | 0.02 | 0.07 | 0.22 |

TABLE 3

| Specimen | Core member | Intermediate member | deformation resistance | | B/A % | Thickness of intermediate member μm | Tensile strength | | | Corrosion resistance test |
|---|---|---|---|---|---|---|---|---|---|---|
| | | | Core member (A) MPa | Intermediate member (B) MPa | | | Before brazing | | After brazing | Maximum corrosion depth μm |
| | | | | | | | σ MPa | δ % | σ MPa | |
| 1 | 1 | 1 | 36 | 34 | 94 | 50 | 130 | 28 | 150 | 140 |
| 2 | 2 | 2 | 35 | 33 | 94 | 70 | 130 | 27 | 145 | 60 |
| 3 | 3 | 3 | 33 | 36 | 109 | 100 | 125 | 30 | 155 | 180 |
| 4 | 4 | 4 | 33 | 35 | 106 | 65 | 125 | 30 | 170 | 160 |
| 5 | 5 | 5 | 37 | 36 | 97 | 80 | 135 | 28 | 165 | 140 |
| 6 | 6 | 6 | 38 | 33 | 87 | 115 | 145 | 26 | 160 | 140 |
| 7 | 7 | 7 | 33 | 34 | 103 | 90 | 125 | 28 | 145 | 170 |
| 8 | 8 | 8 | 34 | 34 | 100 | 75 | 130 | 27 | 150 | 140 |
| 9 | 9 | 9 | 36 | 34 | 94 | 70 | 135 | 27 | 150 | 140 |
| 10 | 10 | 10 | 37 | 33 | 89 | 95 | 150 | 26 | 155 | 170 |
| 11 | 11 | 11 | 36 | 35 | 97 | 65 | 130 | 28 | 170 | 180 |
| 12 | 12 | 12 | 36 | 35 | 97 | 100 | 130 | 29 | 150 | 140 |
| 13 | 13 | 13 | 36 | 33 | 92 | 90 | 130 | 29 | 145 | 120 |
| 14 | 14 | 14 | 36 | 34 | 94 | 105 | 130 | 29 | 150 | 100 |
| 15 | 15 | 15 | 35 | 30 | 86 | 65 | 125 | 29 | 135 | 120 |
| 16 | 16 | 16 | 35 | 37 | 106 | 75 | 135 | 27 | 175 | 130 |
| 17 | 17 | 17 | 35 | 33 | 94 | 35 | 130 | 28 | 155 | 150 |
| 18 | 18 | 18 | 35 | 33 | 94 | 140 | 125 | 30 | 155 | 170 |

COMPARATIVE EXAMPLE 1

By continuous casting, aluminum alloys for a core member having compositions shown in Table 4, those for an intermediate member having compositions shown in Table 5, and an alloy for a brazing member (JIS BA4104) were cast into ingots, and hot cladding rolled under the same conditions as Example 1, to form a cladding plate 3 mm in thickness. Subsequently the cladding plate was cold-rolled, and annealed to finally obtain a cladding plate (O member, brazing sheet) 0.5 mm in thickness. The cladding plate, thus obtained, was press-formed, and treated with vacuum brazing in the same manner as Example 1, to evaluate the

TABLE 5

| Intermediate member | Composition (wt %) | | | | | | |
|---|---|---|---|---|---|---|---|
| | Mg | Si | Fe | Cu | Mn | Cr | Ti |
| 19 | — | — | — | — | — | — | — |
| 20 | 0.73 | 0.07 | 0.20 | 0.00 | 0.04 | 0.03 | 0.04 |
| 21 | 0.73 | 0.09 | 0.19 | 0.01 | 0.08 | 0.01 | 0.03 |
| 22 | 1.77 | 0.07 | 0.23 | 0.03 | 0.03 | 0.04 | 0.02 |
| 23 | 0.25 | 0.08 | 0.20 | 0.04 | 0.04 | 0.02 | 0.09 |

TABLE 5-continued

| Intermediate | Composition (wt %) | | | | | | |
|---|---|---|---|---|---|---|---|
| member | Mg | Si | Fe | Cu | Mn | Cr | Ti |
| 24 | 0.98 | 0.07 | 0.19 | 0.00 | 0.00 | 0.03 | 0.13 |
| 25 | 1.22 | 0.09 | 0.19 | 0.00 | 0.06 | 0.01 | 0.01 |
| 26 | 1.23 | 0.08 | 0.20 | 0.00 | 0.03 | 0.02 | 0.02 |
| 27 | 1.20 | 0.09 | 0.22 | 0.01 | 0.03 | 0.01 | 0.03 |
| 28 | 1.09 | 0.09 | 0.23 | 0.00 | 0.01 | 0.02 | 0.04 |
| 29 | 0.88 | 0.10 | 0.22 | 0.01 | 0.04 | 0.05 | 0.02 |
| 30 | 1.20 | 0.07 | 0.21 | 0.02 | 0.03 | 0.03 | 0.03 |
| 31 | 1.20 | 0.09 | 0.20 | 0.01 | 0.04 | 0.01 | 0.01 | during the press-forming process and a press-formed article could not be obtained. Since Specimen No. 25 contains a small amount of Cu in the core member, the electric potential between the intermediate member and core member becomes smaller, and the sacrificial anode effect lowers, resulting in penetration being caused in the corrosion resistance test.

Since Specimen No. 26 contains a large amount of Ti in the core member and forms large intermetallic compounds during the casting process, a sound cladding plate cannot be obtained. Since Specimen No. 27 contains a small amount of Ti in the core member, sufficient corrosion resistance cannot be attained, which results in a penetrating hole forming in the corrosion resistant test. Since Specimen No. 28 contains

TABLE 6

| Specimen | Core member | Intermediate member | deformation resistance Core member (A) MPa | deformation resistance Intermediate member (B) MPa | B/A % | Thickness of intermediate member µm | Tensile strength Before brazing σ MPa | Tensile strength Before brazing δ % | Tensile strength After brazing σ MPa | Possibility of press forming | Occurrence of the brazing penetration in brazing process | Corrosion resistance test Maximum corrosion depth µm | Corrosion resistance test Occurrence of leakage from brazing article |
|---|---|---|---|---|---|---|---|---|---|---|---|---|---|
| 19 | 19 | 19 | 35 | — | — | — | 155 | 25 | 150 | ○ | ○ | Penetration | X |
| 20 | 20 | 20 | 36 | 34 | 94 | 20 | 160 | 29 | 165 | ○ | ○ | Penetration | X |
| 21 | 21 | 21 | 36 | 34 | 94 | 200 | 120 | 36 | 120 | ○ | ○ | 240 | ○ |
| 22 | 22 | 22 | 34 | 38 | 112 | 70 | — | — | — | — | — | — | — |
| 23 | 23 | 23 | 34 | 23 | 67 | 90 | — | — | — | — | — | — | — |
| 24 | 24 | 24 | 36 | 35 | 97 | 120 | 160 | 25 | 175 | X | X | 80 | — |
| 25 | 25 | 25 | 33 | 35 | 106 | 75 | 150 | 29 | 155 | ○ | ○ | Penetration | X |
| 26 | 26 | 26 | 35 | 35 | 100 | 46 | — | — | — | — | — | — | — |
| 27 | 27 | 27 | 35 | 35 | 100 | 39 | 155 | 28 | 165 | ○ | ○ | Penetration | X |
| 28 | 28 | 28 | 39 | 35 | 90 | 80 | 165 | 26 | 175 | ○ | ○ | Penetration | X |
| 29 | 29 | 29 | 34 | 34 | 100 | 110 | 135 | 30 | 140 | ○ | ○ | 420 | X |
| 30 | 30 | 30 | 39 | 35 | 90 | 80 | — | — | — | — | — | — | — |
| 31 | 31 | 31 | 27 | 36 | 133 | 50 | — | — | — | — | — | — | — |

Note:
Press-forming
○: Yes
X: Causing cracks
Leakage from brazing article
○: No leakage
X: Causing leakage
Penetration of brazing member
○: No penetration
X: penetrating As seen in Table 6, because Specimen No. 19 had no intermediate member and Specimen No. 20 had a thin intermediate member, the sacrificial anode effect was small, resulting in causing a penetrating hole due to pitching in the corrosion resistance test. Since Specimen No. 21 had a thick intermediate member, the tensile strength after the brazing process was inferior. Since Specimen No. 22 contained a large amount of Mg in the intermediate member, surface oxidation was caused and a sound cladding plate could not be obtained. Since Specimen No. 23 contained a small amount of Mg in the intermediate member, the deformation resistance of the intermediate member was low and the cladding rolling property deteriorated, and thereby was unsuitable for forming a sound cladding plate. Since Specimen No. 24 contained a large amount of Cu in the core member, its elongation was too small and cracks occurred a large amount of Mg in the core member, thereby deteriorating the corrosion resistance, which results in a penetrating hole forming in the corrosion resistance test. Further, many penetrations were found at the side opposite the intermediate member. Since Specimen No. 29 contains a small amount of Mg in the core member, and cannot make the potential sufficiently noble, the potential difference between the core member and either the intermediate member or brazing member, becomes smaller, resulting in causing a penetration in the corrosion test, and a reduction in the tensile strength after the brazing process. Since Specimen No. 30 contains a large amount of Mn in the core member, a sound cladding plate cannot be obtained due to the formation of large intermetallic compounds. Since Specimen No. 31 contains small amounts of Mn in the core member, the strength of the core member becomes weak, and since the ratio of the deformation resistance becomes over 130%, the cladding rolling property deteriorates, resulting in a sound cladding plate not being obtained.

EXAMPLE 2

By continuous casting, aluminum alloys for a core member having compositions shown in Table 7, and for an intermediate member having compositions shown in Table 8, were casted into ingots, and were treated for homogenization. For forming the intermediate member, the ingot was hot-rolled to a desired thickness. Separately, a brazing member was prepared by casting an alloy (JIS BA4104, Si:10%, Mg:1.5%, and Bi:0.1%) in the same manner, and hot-rolling at 480° C. to such a thickness that the cladding rate might be 10%, after the surface grinding thereof. The core member, and intermediate member, having the same identification numbers in each Table, and together with the brazing member, were superposed in an order of brazing-intermediate-core, and hot cladding rolled at 480° C. to obtain a cladding plate of 3 mm in thickness. The cladding plate, thus obtained, was further cold-rolled, and annealed to form a cladding plate (O member, brazing sheet) of 0.5 mm in thickness.

TABLE 7

| Core member | Composition (wt %) | | | | | |
|---|---|---|---|---|---|---|
| | Cu | Mn | Mg | Ti | Si | Fe |
| 32 | 0.17 | 0.86 | 0.11 | 0.15 | 0.09 | 0.19 |
| 33 | 0.32 | 1.16 | 0.23 | 0.16 | 0.19 | 0.13 |
| 34 | 0.21 | 0.53 | 0.18 | 0.18 | 0.14 | 0.22 |
| 35 | 0.25 | 1.37 | 0.16 | 0.19 | 0.12 | 0.24 |
| 36 | 0.25 | 1.55 | 0.21 | 0.22 | 0.08 | 0.27 |
| 37 | 0.30 | 1.20 | 0.08 | 0.21 | 0.11 | 0.16 |
| 38 | 0.28 | 0.95 | 0.45 | 0.19 | 0.07 | 0.08 |
| 39 | 0.31 | 1.31 | 0.22 | 0.07 | 0.09 | 0.15 |
| 40 | 0.24 | 0.76 | 0.17 | 0.28 | 0.10 | 0.23 |
| 41 | 0.26 | 0.77 | 0.19 | 0.20 | 0.16 | 0.17 |
| 42 | 0.30 | 1.04 | 0.20 | 0.17 | 0.17 | 0.19 |
| 43 | 0.27 | 1.11 | 0.16 | 0.15 | 0.10 | 0.17 |
| 44 | 0.19 | 1.20 | 0.29 | 0.14 | 0.12 | 0.19 |
| 45 | 0.30 | 1.20 | 0.24 | 0.19 | 0.13 | 0.23 |
| 46 | 0.28 | 1.12 | 0.22 | 0.18 | 0.12 | 0.22 |

TABLE 8

| Intermediate member | Composition (wt %) | | | | |
|---|---|---|---|---|---|
| | Mn | Mg | Si | Fe | Cu |
| 32 | 1.14 | 0.24 | 0.09 | 0.22 | 0.00 |
| 33 | 1.04 | 0.24 | 0.12 | 0.28 | 0.03 |
| 34 | 0.86 | 0.24 | 0.14 | 0.18 | 0.01 |
| 35 | 0.88 | 0.20 | 0.15 | 0.20 | 0.00 |
| 36 | 1.22 | 0.24 | 0.09 | 0.19 | 0.03 |
| 37 | 0.94 | 0.24 | 0.10 | 0.15 | 0.02 |
| 38 | 0.98 | 0.24 | 0.09 | 0.19 | 0.01 |
| 39 | 1.14 | 0.24 | 0.07 | 0.23 | 0.00 |
| 40 | 1.24 | 0.24 | 0.09 | 0.22 | 0.00 |
| 41 | 0.54 | 0.00 | 0.10 | 0.17 | 0.02 |
| 42 | 1.14 | 0.00 | 0.17 | 0.22 | 0.01 |
| 43 | 1.11 | 0.07 | 0.14 | 0.24 | 0.03 |
| 44 | 0.87 | 1.17 | 0.09 | 0.19 | 0.00 |
| 45 | 0.95 | 0.46 | 0.10 | 0.23 | 0.00 |
| 46 | 0.75 | 0.35 | 0.12 | 0.22 | 0.00 |

Figure 1B:
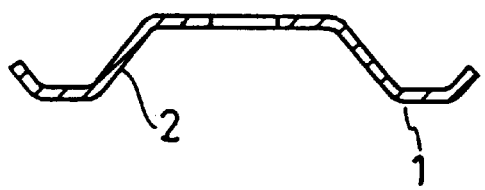
FIG. 1B is a sectional view through section lines 1B—1B of FIG. 1A.
Figure 2:
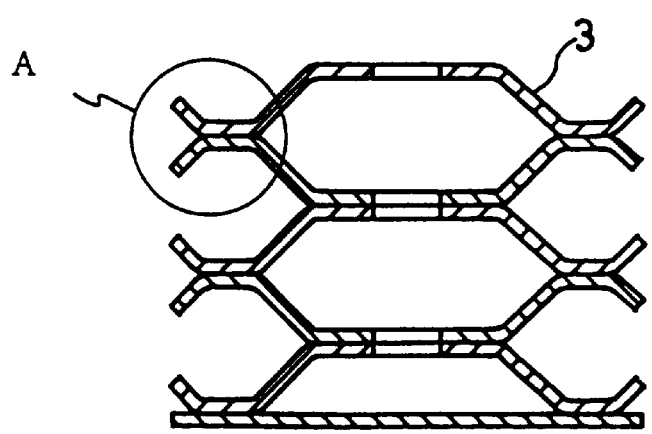
FIG. 2 shows a cross-sectional view of the complete brazed article, in which the press-forming member is joined by a brazing process.

A circular plate was cut out from the cladding plate, and press-formed into a shape 1, as shown in FIGS. 1A and 1B so that the intermediate member might form a convex face. The cup-shaped pressing articles 2, shown in FIG. 2, were alternately interposed as shown in FIG. 2, and vacuum brazed to form brazed article 3. The brazing process was carried out under $5 \times 10^{-5}$ Torr, or lower of vacuum, at 600° C. and maintained for 3 minutes.

The results of the deformation resistance of the core member and intermediate member, ratio of the intermediate member with respect to that of the core member, thickness of the intermediate member, tensile strength before and after the brazing process, and the result of the corrosion resistance, which were conducted in the same manner as in Example 1, are shown in Table 9. As is seen from the results in Table 9, any specimens according to the present invention were able to form a sound cladding steel without warping during the hot cladding rolling process, exhibited no penetration of the brazing member, exhibited an excellent tensile strength after brazing, and caused no cracking in a press forming process into a cup-shaped article. In the corrosion resistance test, the maximum corrosion depth was all less than 200 μm, and an excellent corrosion resistance property was exhibited without causing leakage in the brazed articles.

TABLE 9

| Specimen | Core member | Intermediate member | deformation resistance | | B/A % | Thickness of intermediate member μm | Tensile strength | | | | Corrosion resistance test Maximum corrosion depth μm |
|---|---|---|---|---|---|---|---|---|---|---|---|
| | | | | | | | Before brazing | | After brazing | | |
| | | | Core member (A) MPa | Intermediate member (B) MPa | | | σ MPa | δ % | σ MPa | | |
| 32 | 32 | 32 | 33 | 35 | 106 | 70 | 125 | 29 | 130 | | 125 |
| 33 | 33 | 33 | 36 | 34 | 94 | 45 | 130 | 27 | 135 | | 45 |
| 34 | 34 | 34 | 32 | 33 | 103 | 60 | 120 | 33 | 130 | | 165 |
| 35 | 35 | 35 | 37 | 33 | 89 | 65 | 140 | 28 | 145 | | 150 |
| 36 | 36 | 36 | 38 | 35 | 92 | 55 | 145 | 28 | 150 | | 70 |
| 37 | 37 | 37 | 35 | 34 | 97 | 80 | 130 | 27 | 135 | | 90 |
| 38 | 38 | 38 | 37 | 34 | 92 | 60 | 135 | 27 | 145 | | 55 |
| 39 | 39 | 39 | 37 | 35 | 95 | 70 | 140 | 26 | 135 | | 140 |
| 40 | 40 | 40 | 33 | 35 | 106 | 85 | 125 | 30 | 130 | | 90 |
| 41 | 41 | 41 | 34 | 29 | 85 | 80 | 120 | 32 | 130 | | 85 |
| 42 | 42 | 42 | 35 | 33 | 94 | 65 | 130 | 29 | 140 | | 70 |
| 43 | 43 | 43 | 35 | 33 | 94 | 60 | 125 | 28 | 140 | | 75 |
| 44 | 44 | 44 | 36 | 40 | 111 | 50 | 130 | 30 | 135 | | 50 |

TABLE 9-continued

|  |  |  | deformation resistance | | | | Tensile strength | | Corrosion resistance | |
|---|---|---|---|---|---|---|---|---|---|---|
|  |  |  | Core | Intermediate |  | Thickness of | Before brazing | After brazing | test Maximum | |
| Specimen | Core member | Intermediate member | member (A) MPa | member (B) MPa | B/A % | intermediate member μm | σ MPa | δ % | σ MPa | corrosion depth μm |
| 45 | 45 | 45 | 37 | 35 | 95 | 45 | 135 | 27 | 135 | 175 |
| 46 | 46 | 46 | 36 | 33 | 92 | 140 | 135 | 27 | 130 | 160 |

COMPARATIVE EXAMPLE 2

By continuous casting, aluminum alloys for a core member having compositions shown in Table 10, those for an intermediate member having compositions shown in Table 11, and an alloy for a brazing member (JIS BA4104) were casted into ingots, and hot cladding-rolled under the same conditions as in Example 1, to form a cladding plate 3 mm in thickness. Subsequently, the cladding plate was cold-rolled, and annealed to finally obtain a cladding plate (O member, brazing sheet) 0.5 mm in thickness. The cladding plate, thus obtained, was press formed, and treated by vacuum brazing in the same manner as Example 1, to evaluate the possibility for press forming, and measured tensile strength, corrosion resistance test and micro-structure observation. Furthermore, the deformation resistance of the core member, and of the intermediate member was evaluated, respectively, in the same manner as in Example 1. The results of the deformation resistance for the core member and intermediate member, ratio thereof, thickness of the intermediate member, possibility of press-forming, tensile strength, corrosion test, and microstructure observation are shown in Table 12.

TABLE 10

| Core member | Composition (wt %) | | | | | |
|---|---|---|---|---|---|---|
|  | Cu | Mn | Mg | Ti | Si | Fe |
| 47 | 0.27 | 0.89 | 0.17 | 0.15 | 0.08 | 0.22 |
| 48 | 0.22 | 1.07 | 0.12 | 0.17 | 0.09 | 0.21 |
| 49 | 0.34 | 0.88 | 0.09 | 0.14 | 0.07 | 0.17 |
| 50 | 0.31 | 0.78 | 0.24 | 0.14 | 0.09 | 0.19 |
| 51 | 0.24 | 0.87 | 0.24 | 0.16 | 0.08 | 0.23 |
| 52 | 0.32 | 0.57 | 0.22 | 0.14 | 0.08 | 0.18 |
| 53 | 0.54 | 0.95 | 0.33 | 0.16 | 0.07 | 0.17 |
| 54 | 0.09 | 1.06 | 0.06 | 0.18 | 0.09 | 0.22 |
| 55 | 0.29 | 0.89 | 0.17 | 0.47 | 0.09 | 0.24 |
| 56 | 0.17 | 1.43 | 0.05 | 0.02 | 0.08 | 0.22 |
| 57 | 0.23 | 0.76 | 0.84 | 0.17 | 0.08 | 0.17 |
| 58 | 0.30 | 1.82 | 0.12 | 0.24 | 0.09 | 0.19 |
| 59 | 0.30 | 0.38 | 0.12 | 0.24 | 0.07 | 0.22 |

TABLE 11

| Intermediate member | Composition (wt %) | | | | |
|---|---|---|---|---|---|
|  | Mn | Mg | Si | Fe | Cu |
| 47 | — | — | — | — | — |
| 48 | 0.90 | 0.23 | 0.07 | 0.20 | 0.00 |
| 49 | 0.88 | 0.23 | 0.09 | 0.19 | 0.03 |
| 50 | 0.04 | 0.01 | 0.08 | 0.22 | 0.01 |
| 51 | 1.55 | 0.20 | 0.08 | 0.17 | 0.03 |
| 52 | 0.78 | 1.43 | 0.07 | 0.23 | 0.02 |
| 53 | 0.67 | 0.18 | 0.07 | 0.19 | 0.01 |
| 54 | 0.87 | 0.22 | 0.09 | 0.19 | 0.00 |
| 55 | 1.06 | 0.23 | 0.08 | 0.20 | 0.00 |
| 56 | 0.85 | 0.20 | 0.09 | 0.22 | 0.02 |
| 57 | 0.97 | 0.19 | 0.09 | 0.23 | 0.01 |
| 58 | 0.76 | 0.20 | 0.07 | 0.21 | 0.03 |
| 59 | 0.76 | 0.20 | 0.09 | 0.20 | 0.00 |

TABLE 12

| Specimen | Core member | Intermediate member | deformation resistance | | | Thickness of intermediate member μm | Tensile strength | | | Possibility in the press forming | Corrosion resistance test | | |
|---|---|---|---|---|---|---|---|---|---|---|---|---|---|
|  |  |  | Core member (A) MPa | Intermediate member (B) MPa | B/A % |  | Before brazing σ MPa | δ % | After brazing σ MPa |  | Occurrence of brazing penetration | Maximum corrosion depth μm | Occurrence of the leakage from brazing article |
| 47 | 47 | 47 | 35 | — | — | — | 155 | 25 | 150 | ◯ | ◯ | Penetration | X |
| 48 | 48 | 48 | 36 | 34 | 94 | 20 | 145 | 26 | 155 | ◯ | ◯ | Penetration | X |

TABLE 12-continued

| | | | deformation resistance | | | | Tensile strength | | | | Corrosion resistance test | |
|---|---|---|---|---|---|---|---|---|---|---|---|---|
| | | | | Inter- | | | Before brazing | | After brazing | Possibility | Occurrence of brazing | Occurrence of the |
| | | | Core member | mediate member | | Thickness of | | | | in the | penetration | leakage |
| Specimen | Core member | Intermediate member | (A) MPa | (B) MPa | B/A % | intermediate member μm | σ MPa | δ % | σ MPa | press forming | in brazing process | Maximum corrosion depth μm | from brazing article |
| 49 | 49 | 49 | 35 | 34 | 97 | 190 | 125 | 37 | 125 | ○ | ○ | 176 | ○ |
| 50 | 50 | 50 | 35 | 20 | 57 | 60 | — | — | — | — | — | — | — |
| 51 | 51 | 51 | 35 | 37 | 106 | 74 | 160 | 24 | 160 | ○ | ○ | Penetration | X |
| 52 | 52 | 52 | 34 | 39 | 115 | 60 | — | — | — | — | — | — | — |
| 53 | 53 | 53 | 36 | 32 | 89 | 86 | 160 | 20 | 160 | X | ○ | 87 | — |
| 54 | 54 | 54 | 33 | 34 | 103 | 75 | 120 | 35 | 120 | ○ | ○ | Penetration | X |
| 55 | 55 | 55 | 35 | 35 | 100 | 46 | — | — | — | — | — | — | — |
| 56 | 56 | 56 | 35 | 34 | 97 | 63 | 140 | 28 | 150 | ○ | ○ | 340 | ○ |
| 57 | 57 | 57 | 39 | 35 | 90 | 68 | 155 | 20 | 145 | X | ○ | Penetration | — |
| 58 | 58 | 58 | — | 34 | — | 64 | — | — | — | — | — | — | — |
| 59 | 59 | 59 | 30 | 34 | 113 | 64 | 120 | 35 | 122 | ○ | ○ | Penetration | X |

Note:
Press forming
○: Yes
X: Causing cracks
Leakage from brazing article
○: No leakage
X: Causing leakage
Penetration of brazing member
○: No penetration
X: penetrating As seen in Table 12, because Specimen No. 47 has no intermediate member and Specimen No. 48 has a thinner intermediate member, the sacrificial anode effect is small, resulting in causing a penetrating hole due to pitching in the corrosion resistance test. Since Specimen No. 49 has a thick intermediate member, the tensile strength after the brazing process was inferior. Since Specimen No. 50 contained small amounts of both Mg and Mn in the intermediate member, the deformation resistance of the intermediate member was low, and the cladding rolling property deteriorated, thereby being unavailable for forming a sound cladding plate. Since Specimen No. 51 contained a large amount of Mn, the sacrificial anode effect lowered, resulting in causing a penetration hole in the corrosion resistance test. Since Specimen No. 52 contained a large amount of Mg in the intermediate member, surface oxidation was caused, thereby failing to obtain a sound cladding plate. Since Specimen No. 53 contained a large amount of Cu in the intermediate member, its elongation was too small and cracks were formed during the press-forming process, and press-formed articles could not be obtained.

Since Specimen No. 54 contained small amounts of Cu in the core member, the electrical potential in the core member could not be made sufficiently noble, resulting in causing a penetration in the corrosion resistance test, and the tensile strength after the brazing process deteriorated. Since Specimen No. 55 contained a large amount of Ti in the core member and formed large intermetallic compounds during the casting process, a sound cladding plate could not be obtained. Since Specimen No. 56 contained small amounts of Ti in the core member, sufficient corrosion resistance could not be attained, resulting in the formation of a deep penetrating hole in the corrosion resistance test. Since Specimen No. 57 contained a large amount of Mg in the core member, thereby causing cracks in the press-forming process, and press-formed article could not be obtained. No. 58 contained a large amount of Mn in the core member so a sound cladding plate could not be obtained due to the formation of large intermetallic compounds. Since Specimen No. 59 contained a small amount of Mn in the core member, the potential could not make the core member sufficiently noble, thereby the electric potential between the core member and intermediate member, or brazing member, lowered and resulted in causing a penetrating hole in the corrosion resistance test, and also the tensile strength after the brazing process was small.

EXAMPLE 3

By continuous casting, aluminum alloys for a core member having compositions shown in Table 13, and for an intermediate member having compositions shown in Table 14, were casted into ingots, and were treated for homogenization. For forming the intermediate member, the ingot was hot-rolled to a desired thickness. Separately, a brazing member was prepared by casting an alloy (JIS BA4104, Si:10%, Mg:1.5%, and Bi:0.1%) in the same manner, and hot-rolling at 480° C. to such a thickness that the cladding rate might be 10% after the surface grinding thereof. The core member and intermediate member, having the same identification numbers in each Table, and together with the brazing member, were superposed in the order of brazing-intermediate-core, and hot cladding-rolled at 480° C. to obtain a cladding plate 3 mm in thickness. The cladding plate, thus obtained, was further cold-rolled, and annealed to form a cladding plate (O member, brazing sheet) 0.5 mm in thickness. The thickness of the intermediate member was 15% of the total plate thickness.

TABLE 13

| Core member | Composition (wt %) | | | | | |
|---|---|---|---|---|---|---|
| | Cu | Mn | Mg | Ti | Si | Fe |
| A | 0.31 | 0.89 | 0.23 | 0.19 | 0.08 | 0.22 |
| B | 0.17 | 1.51 | 0.32 | 0.18 | 0.08 | 0.22 |
| C | 0.28 | 0.58 | 0.29 | 0.22 | 0.09 | 0.23 |
| D | 0.33 | 0.98 | 0.17 | 0.12 | 0.08 | 0.18 |
| E | 0.16 | 1.14 | 0.22 | 0.16 | 0.09 | 0.16 |
| F | 0.29 | 1.31 | 0.07 | 0.14 | 0.09 | 0.16 |
| G | 0.31 | 1.22 | 0.46 | 0.20 | 0.07 | 0.21 |
| H | 0.25 | 0.84 | 0.20 | 0.07 | 0.08 | 0.21 |
| I | 0.32 | 0.74 | 0.19 | 0.26 | 0.07 | 0.21 |

TABLE 14

| Intermediate member | Composition (wt %) | | | |
|---|---|---|---|---|
| | Zn | Mg | Si | Fe |
| a | 2.3 | 0.82 | 0.08 | 0.18 |
| b | 1.8 | 0.54 | 0.08 | 0.18 |
| c | 4.7 | 0.74 | 0.08 | 0.18 |
| d | 2.5 | 1.10 | 0.07 | 0.17 |
| e | 1.4 | 0.94 | 0.09 | 0.22 |
| f | 3.3 | 0.53 | 0.09 | 0.24 |

Figure 3:
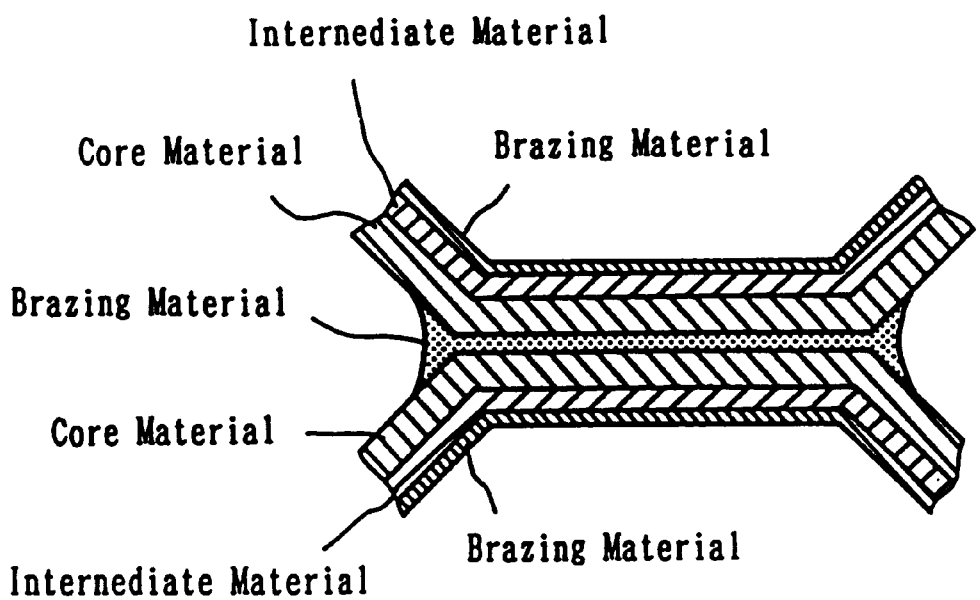
FIG. 3 shows an enlarged view of the brazing part A, in detail.

A circular plate was cut out from the cladding plate, and press-formed into a shape 1, as shown in FIG. 1, so that the intermediate member might have a convex face. The cup-shaped pressed articles 2, shown in FIG. 2, were alternately interposed as shown in FIG. 2, and vacuum brazed to form brazed article 3. The brazing process was carried out under $5 \times 10^{-5}$ Torr, or lower of vacuum, at 600° C. and maintained for 3 minutes. A detailed cross-sectional view of the brazing part after the brazing process is shown in FIG. 3.

The tensile strength before and after the brazing process, brazing attack state of the core member, and Zn concentrations at the boundary between the intermediate member and core member, were evaluated in the same manner as in Example 1, and the corrosion resistance test of the Specimens were conducted in the same manner as in Example 1. Results are shown in Table 15. As seen from the results in Table 15, all specimens according to the present invention were able to form a sound cladding steel without warping during the hot cladding-rolling process, exhibited no penetration of the brazing member and an excellent tensile strength after brazing, and caused no cracking during a press-forming process into a cup-shaped article. In the corrosion resistance test, the maximum corrosion depth was less the 0.2 mm, and an excellent corrosion resistance property was exhibited without causing leakage in the brazed articles.

TABLE 15

| | Combination | | Tensile property | | | Zn concentration | | Corrosion test Maximum corrosion depth mm |
|---|---|---|---|---|---|---|---|---|
| | | | Before brazing | | After brazing | Boundary between intermediate member and core member % | Brazing side of core member % | |
| Specimen | Core member | Intermediate member | σ MPa | δ % | σ MPa | | | |
| 60 | A | a | 145 | 26 | 150 | 0.7 | 0.08 | 0.09 |
| 61 | B | a | 155 | 26 | 165 | 0.7 | 0.08 | 0.13 |
| 62 | C | a | 135 | 28 | 140 | 0.7 | 0.08 | 0.10 |
| 63 | D | a | 145 | 26 | 145 | 0.7 | 0.08 | 0.11 |
| 64 | E | a | 145 | 28 | 145 | 0.7 | 0.08 | 0.15 |
| 65 | F | a | 150 | 29 | 150 | 0.7 | 0.08 | 0.11 |
| 66 | G | a | 145 | 27 | 150 | 0.7 | 0.08 | 0.12 |
| 67 | H | a | 140 | 30 | 140 | 0.7 | 0.08 | 0.14 |
| 68 | I | a | 140 | 27 | 145 | 0.7 | 0.08 | 0.09 |
| 69 | A | b | 140 | 26 | 140 | 0.6 | 0.03 | 0.11 |
| 70 | A | c | 145 | 27 | 145 | 1.7 | 0.24 | 0.08 |
| 71 | A | d | 150 | 25 | 150 | 0.8 | 0.08 | 0.09 |
| 72 | A | e | 145 | 26 | 145 | 0.5 | 0.03 | 0.12 |
| 73 | A | f | 150 | 26 | 140 | 0.1 | 0.15 | 0.08 |

Note: "Zn concentration at brazing side of core member" means the average Zn concentration from the thickness center of a core member to the boundary between the core member and the intermediate member.

COMPARATIVE EXAMPLE 3

By continuous casting, aluminum alloys for a core member having compositions shown in Table 16, those for an intermediate member having compositions shown in Table 17, and an alloy for a brazing member (JIS BA4104) were cast into ingots, and hot cladding-rolled under the same conditions as Example 3, to form a cladding plate 3 mm in thickness. Subsequently, the cladding plate was cold-rolled and annealed to finally obtain a cladding plate (O member, brazing sheet) 0.5 mm in thickness. The cladding plate, thus obtained, was press-formed, and treated by vacuum brazing in the same manner as Example 1, to evaluate its possibility for press-forming, measured tensile strength, corrosion resistance test and micro-structure observation. Furthermore, the deformation resistance of the core member, and of the intermediate member was evaluated, respectively, in the same manner as in Example 1. The results of the deformation resistance for the core member and intermediate member, ratio thereof, thickness of the intermediate member, possibility of press forming, tensile strength, corrosion test, and microstructure observation are shown in Table 18.

TABLE 16

| Core | Composition (wt %) | | | | | |
|---|---|---|---|---|---|---|
| member | Cu | Mn | Mg | Ti | Si | Fe |
| J | 0.3 | 0.35 | 0.2 | 0.2 | 0.08 | 0.22 |
| K | 0.3 | 1.84 | 0.2 | 0.2 | 0.08 | 0.22 |
| L | 0.08 | 0.8 | 0.2 | 0.2 | 0.09 | 0.23 |
| M | 0.39 | 0.8 | 0.2 | 0.2 | 0.08 | 0.18 |
| N | 0.3 | 0.8 | 0.02 | 0.2 | 0.09 | 0.16 |

TABLE 16-continued

| Core | Composition (wt %) | | | | | |
|---|---|---|---|---|---|---|
| member | Cu | Mn | Mg | Ti | Si | Fe |
| O | 0.3 | 0.8 | 0.66 | 0.2 | 0.09 | 0.16 |
| P | 0.3 | 0.8 | 0.2 | 0.03 | 0.07 | 0.21 |
| Q | 0.3 | 0.8 | 0.2 | 0.37 | — | — |

TABLE 17

| Intermediate | Composition (wt %) | | | |
|---|---|---|---|---|
| member | Zn | Mg | Si | Fe |
| g | 2.5 | 0.43 | 0.09 | 0.23 |
| h | 2.0 | 1.32 | 0.08 | 0.18 |
| i | 0.7 | 0.8 | 0.09 | 0.16 |
| j | 5.8 | 0.8 | 0.09 | 0.16 |

TABLE 18

| | Combination | | | | Zn concentration | | Tensile property | | | Corrosion test | |
|---|---|---|---|---|---|---|---|---|---|---|---|
| | | | | | Boundary between intermediate member and core member % | Brazing side of core member % | Before brazing | | After brazing | Maximum | Occurrence of leakage |
| Specimen | Core member | Intermediate member | Press forming | Penetration of the brazing member | | | σ MPa | δ % | σ MPa | corrosion depth mm | from brazing article |
| 74 | J | a | ○ | ○ | 0.7 | 0.04 | 110 | 42 | 90 | 0.10 | ○ |
| 75 | K | a | — | — | — | — | — | — | — | — | — |
| 76 | L | a | ○ | ○ | 0.7 | 0.04 | 125 | 35 | 120 | 0.39 | X |
| 77 | M | a | X | — | — | — | 130 | 23 | — | — | — |
| 78 | N | a | ○ | ○ | 0.7 | 0.04 | 145 | 28 | 140 | 0.25 | ○ |
| 79 | O | a | ○ | X | 0.7 | 0.04 | 145 | 25 | 150 | 0.33 | ○ |
| 80 | P | a | ○ | ○ | 0.7 | 0.04 | 145 | 27 | 140 | 0.44 | X |
| 81 | Q | a | — | — | — | — | — | — | — | — | — |
| 82 | A | g | — | — | — | — | — | — | — | — | — |
| 83 | A | h | ○ | ○ | 0.5 | 0.03 | 150 | 25 | 155 | — | — |
| 84 | A | i | ○ | ○ | 0.3 | 0.00 | 145 | 26 | 140 | 0.27 | ○ |
| 85 | A | j | ○ | ○ | 2.2 | 0.34 | 145 | 26 | 145 | 0.24 | ○ |

Note: "Zn concentration at brazing side of core member" means an average Zn concentration from the thickness center of the core member to a boundary between the core member and the intermediate member.
Note:
Press forming
○: Yes
X: Causing cracks
Leakage from brazing article
○: No leakage
X: Causing leakage
Penetration of brazing member
○: No penetration
X: penetrating As seen from the results in Table 18, the following Specimens were studied as follows:

Since Specimen No. 74 contained a small amount of Mn in the core member, its strength after brazing was inferior. Since Specimen No. 75 contained a large amount of Mn in the core member, a large crystal product was formed in the casting process and an excellent cladding member could not be formed. Since Specimen No. 76 contained a small amount of Cu in the core member, deep corrosion was caused in the core member and a penetration hole formed in the brazing article. Since Specimen No. 77 contained a large amount of Cu in the core member, elongation of the raw element was too small and excellent press-forming could not be expected. Since Specimen No. 78 contained a small amount of Mg in the core member, the depth of corrosion was too deep. Since Specimen No. 79 contained a large amount of Mg in the core member, the penetration of the brazing was serious. Since Specimen No. 80 contained a small amount of Ti, the depth of corrosion became large and a penetration hole formed in the brazing article. Since Specimen No. 81 contained a large amount of Ti in the core member, a coarse crystal was produced, thereby making it difficult to obtain a sound cladding member.

Since Specimen No. 82 contained a small amount of Mg in the intermediate member, the plate warped during the cladding rolling process and thereby was unable to form a brazing sheet. Since Specimen No. 83 contained a large amount of Mg in the intermediate member, a brazing defect was caused. Since Specimen No. 84 contained a small amount of Zn in the intermediate member, the amount of Zn in the boundary between the intermediate member and the core member was small so that the sacrificial anode effect of the intermediate member was low, leading to a deep corrosion depth. Since Specimen No. 85 contained too much Zn in the intermediate member, an adequate concentration gradient could not be formed and the corrosion depth was serious. Further, a large amount of Zn evaporated and deposited onto the wall surface of the furnace.

According to the present invention, there is provided an aluminum alloy brazing sheet for a heat exchanger which exhibits an excellent corrosion resistance and cladding rolling property, and an aluminum alloy heat exchanger formed therefrom. Said brazing sheet is suitable for application as a constituting member of the fluid path in an aluminum alloy heat exchanger for car and is particularly suitable as a core plate in a drawn cup type heat exchanger.

What is claimed is:

1. In a heat exchanger in which a coolant is circulated through an inner passageway in the heat exchanger, the improvement comprising said heat exchanger comprising a brazing sheet formed from a four-layer aluminum alloy cladding member, said cladding member comprising a core member formed from an aluminum alloy comprising 0.5–1.6 wt. % Mn, 0.15–0.35 wt. % Cu, 0.05–0.70 wt. % Mg, 0.06–0.30 wt. % Ti and the balance being Al and unavoidable impurities, an intermediate member which is less noble than the core member provided on one side of the core member and an Al—Si—Mg cladding provided on the other side of the core member and the intermediate member, the core member forming at least part of the inner passageway and contacting with said coolant.

2. The heat exchanger of claim 1, wherein the aluminum alloy of the core member comprises 0.7 to 1.4 wt. % Mn, 0.15 to 0.35 wt. % Cu, 0.05 to 0.70 wt. % Mg, and 0.06 to 0.30 wt. %.

3. The heat exchanger of claim 1, wherein the intermediate member is made of an aluminum alloy which comprises 0.3 to 1.5 wt. % Mg and the balance being aluminum and unavoidable impurities, has a deformation resistance of 70–130% and a thickness of 30 to 150 μm.

4. The heat exchanger of claim 1, wherein the aluminum alloy of the intermediate member comprises 0.5 to 1.5 wt. % Mn and the balance being aluminum and unavoidable impurities, a deformation resistance of 70–130% and a thickness of 30 to 150 μm.

5. The heat exchanger of claim 4, wherein the aluminum alloy of the intermediate member comprises 0.7 to 1.2 wt. % Mn and the balance being aluminum and unavoidable impurities.

6. The heat exchanger of claim 1, wherein the aluminum alloy of the intermediate member comprises 0.5 to 1.2 wt. % Mn, 0.05 to 1.2 wt. % Mg and the balance being aluminum and unavoidable impurities.

7. The heat exchanger of claim 6, wherein the aluminum alloy of the intermediate member comprises 0.7 to 1.2 wt. % Mn, 0.05 to 1.2 wt. % Mg and the balance being aluminum and unavoidable impurities.

8. The heat exchanger of claim 1, wherein the aluminum alloy of the intermediate member comprises 1 to 5 wt. % Zn, 0.5 to 1.2 wt. % Mg and the balance being aluminum and unavoidable impurities.

9. The heat exchanger of claim 1, wherein the aluminum alloy of the intermediate member comprises 1.2 to 5 wt. % Zn, 0.5 to 1.2 wt. % Mg and the balance being aluminum and unavoidable impurities.

10. The heat exchanger of claim 1, wherein said heat exchanger is a drawn cup heat exchanger formed by a vacuum brazing process.

11. In a heat exchanger in which a coolant is circulated through an inner passageway in the heat exchanger, the improvement comprising said heat exchanger comprising a plurality of brazing sheets, each of said brazing sheets being formed from a four-layer aluminum alloy cladding member, said cladding member comprising a core member formed from an aluminum alloy comprising 0.5–1.6 wt. % Mn, 0.15–0.35 wt. % Cu, 0.05–0.70 wt. % Mg, 0.06–0.30 wt. % Ti and the balance being Al and unavoidable impurities, an intermediate member which is less noble than the core member and comprising 1–5 wt. % Zn, 0.5–1.2 wt. % Mg and the balance being Al and unavoidable impurities provided on one side of the core member and an Al—Si—Mg cladding provided on the other side of the core member and the intermediate member, said brazing sheets being superposed one another such that the intermediate members face outward and said core members face inward and form at least part of said inner passageway and contact with said coolant and are joined together by brazing and the concentration of Zn in the boundary between the core member and the intermediate member is 0.5–2.5 wt. % and the average concentration of Zn between the center of the core member to the boundary between the core member and the cladding provided thereon is no greater than 0.3 wt. %.

* * * * *

UNITED STATES PATENT AND TRADEMARK OFFICE
CERTIFICATE OF CORRECTION

PATENT NO : 6 129 143
DATED : October 10, 2000
INVENTORS : Yoshiharu HASEGAWA et al It is certified that error appears in the above-identified patent and that said Letters Patent are hereby corrected as shown below:

```
Column 25,   line 57;    change "0.30 wt.%."
                         to ---0.30 wt.% Ti.---.
```

Signed and Sealed this

Eighth Day of May, 2001

Attest:

NICHOLAS P. GODICI

Attesting Officer     Acting Director of the United States Patent and Trademark Office